INVENTORS
Charles O. Slemmons
Stephen C. Sabo
BY McCoy, Greene & Grotenhuis
ATTORNEYS INVENTORS
Charles O. Slemmons
Stephen C. Sabo
ATTORNEYS Dec. 6, 1960  C. O. SLEMMONS ET AL  2,962,757
METHOD OF AND APPARATUS FOR MOLDING AND
VULCANIZING A FABRIC REINFORCED
RUBBER AIR SPRING BELLOWS
Filed Dec. 18, 1958  4 Sheets-Sheet 3

INVENTORS
Charles O. Slemmons
Stephen C. Sabo
BY
ATTORNEYS

INVENTORS
Charles O. Slemmons
Stephen C. Sabo
BY McCoy, Greene & Le Grotenhuis
ATTORNEYS

United States Patent Office 2,962,757
Patented Dec. 6, 1960

2,962,757

METHOD OF AND APPARATUS FOR MOLDING AND VULCANIZING A FABRIC REINFORCED RUBBER AIR SPRING BELLOWS

Charles O. Slemmons, Akron, and Stephen C. Sabo, Barberton, Ohio, assignors to The General Tire & Rubber Company, Akron, Ohio, a corporation of Ohio Filed Dec. 18, 1958, Ser. No. 781,295

11 Claims. (Cl. 18—17)

This invention relates to the manufacture of an air spring bellows of flaring tubular form made of rubber reinforced with superposed plies of cord fabric and having beaded ends of different diameters, and more particularly to a method of and apparatus for molding and vulcanizing such a bellows.

In the forming of an air spring bellows of the character referred to, a blank is formed by building a cylindrical tube composed of rubber and superposed plies of bias cut cord fabric having their cords disposed in crossing relation, expanding one end of the tube and applying large and small inextensible bead rings to the large and small ends of the tube, after which the blank is molded and vulcanized to form the air spring bellows.

There may be a considerable difference in diameters of the beaded ends of the bellows and the flexible body may have a large angle of taper. For example, the diameter of the large end of the bellows may be more than twice the diameter of its small end and greater than its axial length. In order to provide the most effective reinforcement of the flexible wall, it is desirable that the cords be uniformly spaced and substantially free from tensile stresses when the wall of the bellows is in normal position, so that the cords will be substantially uniformly stressed by deformations of the wall caused by relative axial movements of the ends of the bellows in service.

When the tube from which the body of the bellows is formed is expanded at one end to an extent such that there is a considerable change in the spacing and angularity of the cords at the expanded end, it is impossible to obtain exactly uniform readjustment of the cords due to the resistance offered to relative sliding movement of the cords of superposed plies during expansion, and some of the cords are apt to be under greater tension than others in the expanded tube with the result that, after vulcanization, the cords will be subjected to unequal stresses during flexing of the air spring bellows in service due to the unequal spacing and the unequal stresses on the cord at the time of vulcanization.

The present invention provides a method by which better reinforcement of the flexible wall of the bellows is obtained. In accordance with the method of the present invention the bellows blank is subject to a flexing movement similar to that to which the bellows will be subjected when in operation before it is molded and vulcanized. This flexing effects a readjustment of the cords and tends to equalize the tension on the cords so that there will be a more uniform distribution of stresses when the bellows is flexed in service, so that there are fewer failures of the air springs due to rupture of cords and an appreciable increase in the average life of the air springs is effected.

The preliminary flexing of the air spring blank is preferably accomplished in the vulcanizing mold during the closing of the mold on the blank, the mold being provided with means for moving the small end of the blank axially through the large end to turn the tubular body of the blank inside out and then to return the small end of the blank to the position which it normally occupies in the finished bellows while closing, the return of the blank to its molding position being accomplished during the final closing movement of the mold.

The mold is provided with mating mold members, one of which is a rigid mold member having a rigid core portion that conforms to the interior of the bellows and that engages the interior of the blank, concentric annular shoulders being provided for engagement with the end beads of the blank, the larger of the shoulders extending around the base of the core portion and the smaller of the shoulders being located at the tip of the core portion. The opposed mold member has inner and outer rigid annular clamping portions that are relatively movable axially and that are alined with the shoulders of the rigid mold member to clamp the beads of the blank against said annular shoulders and the two clamping portions are connected by an annular flexible diaphragm that is attached throughout its outer periphery to the outer annular clamping portion and throughout its inner periphery to the inner annular clamping portion. The inner bead clamping portion is guided for movement axially with respect to the outer bead clamping portion and is movable axially through the outer clamping portion to reverse the taper of the diaphragm.

The mold is provided with means for supporting the bellows blank in axial alinement with the mold members and between the same with its large end facing the rigid mold member. The inner clamping portion to which the diaphragm is attached is moved toward the rigid mold member to place the diaphragm in a position in which it tapers toward the rigid mold member. During closing of the mold the blank is moved into engagement with the central clamping portion and the movement of the large end of the blank is continued after the movement of the small end is arrested by engagement with the clamping member to turn the blank inside out over the diaphragm. As the closing movement of the mold continues the rigid mold member is brought into clamping engagement with the small end of the blank and moves the small end of the blank and the diaphragm supporting clamping member axially through the plane of the outer clamping portion to which the outer periphery of the diaphragm is attached to return the small end of the blank to the position with respect to the large end which it is to occupy in the finished bellows, the large beads being then clamped to the rigid mold member and the interior face of the flexible wall of the blank being brought into engagement with the core portion of the rigid mold member.

Means is provided for supplying fluid presssure to the diaphragm to press it against the flexible wall of the blank confined between the diaphragm and the core portion of the rigid mold member and, in order to prevent entrapment of air between the unvulcanized blank and the mold members, inflation pressure is applied to the diaphragm while the diaphragm and blank are being reversed, so that the wall of the blank is progressively pressed against the core portion of the mold during the final closing movement of the mold.

Reference should be had to the accompanying drawings forming part of this specification, in which.

Figures 8, 9:
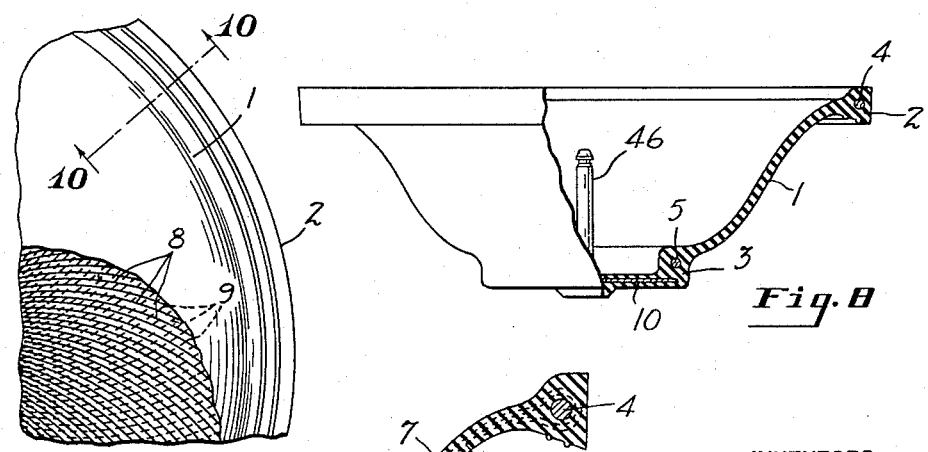
Fig. 8 is a side elevation of the air spring bellows with a portion broken away and shown in vertical section.
Fig. 9 is a fragmentary plan view showing the reinforcing cords of the bellows.
Figure 10:
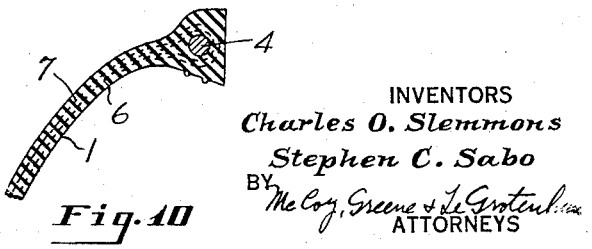
Fig. 10 is a fragmentary section taken on the line indicated at 10—10 in Fig. 8.

Referring to Figs. 8, 9 and 10 of the drawings, the finished air spring bellows has a flaring tubular wall 1 provided with large and small beads 2 and 3 at its opposite ends which are provided with inextensible bead rings 4 and 5. The flexible wall of the bellows is reinforced by superposed plies of bias cut cords fabric 6 and 7 that are wrapped around the bead rings 4 and 5, parallel cords 8 and 9 of the superposed plies being disposed in crossing relation. A rubber covered closure disk 10 is provided for the small end of the bellows.

In the manufacture of a bellows which is shown in Figs. 8, 9 and 10, a tube formed of superposed plies of bias cut cord fabric arranged with their parallel cords in crossing relation is built upon a cylindrical mandrel or form, after which the tube is expanded to enlarge one end thereof and the large and small beads 2 and 3 are applied to the large and small ends of the flaring tube, after which the blank is molded under pressure to the form of the bellows in a suitable mold and heat is applied to the molded blank to vulcanize the same.

In molding the blank by the method of the present invention, the molding and vulcanizing operations are performed in a mold having opposed parts mounted on a relatively movable base 11 and head 12 of a suitable press. As herein shown, the base 11 is stationary and the head 12 is carried by a piston 13 of a suitable fluid pressure actuating cylinder (not shown). A rigid upper mold member 14 is mounted on the head 12 and this member is provided with a flat marginal sealing face 15 and a central core portion 16 that is shaped to conform to the interior of the air spring bellows to be molded. The mold member 14 has an outer annular bead engaging shoulder 17 that extends around the base of the core portion 16 and an inner annular bead engaging shoulder 18 at the tip of the core portion 16.

Figure 7:
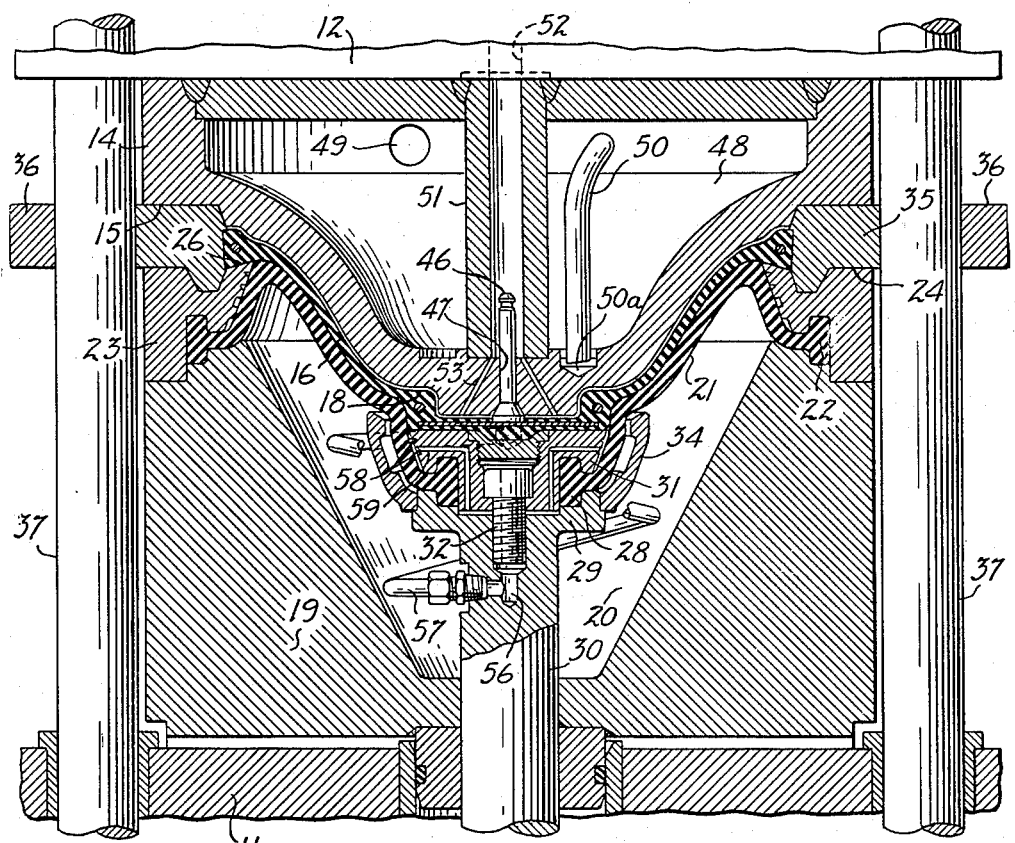
Fig. 7 is a vertical section showing the mold in closed position.

The lower mold member includes a rigid body portion 19 mounted on the base 11 and provided with a central recess or well portion 20 that provides a fluid pressure chamber. An annular diaphragm 21 provides the pressure chamber 20 with a movable top wall, the diaphragm 20 having an outer peripheral rim 22 that is clamped to the body 19 by means of a clamping ring 23 that is provided at its outer margin with a flat top face portion 24 beneath and parallel to the sealing face 15 of the upper mold member. The ring 23 is provided with an upwardly tapering interior face 25 for engagement with the diaphragm 21 when the diaphragm is in its molding position as shown in Fig. 7. At its inner margin the clamping ring 23 is provided with a bead clamping face 26 that is alined with the bead engaging shoulder 17 of the upper mold member, the large bead of the bellows blank being gripped between the face 26 and the shoulder 17 when the mold is closed, as shown in Fig. 7. Outwardly of the clamping face 26 the top face of the ring 23 is provided with a circumferential positioning groove 27 provided with reversely inclined inner and outer walls.

The diaphragm 21 is provided with an inner peripheral rim 28 that is clamped to a head 29 carried by the upper end of a central vertical post 30 that is slidably mounted in the base 11 by means of a clamping cap 31 secured to the head 29 by means of a central tubular bolt 32. The clamping cap 31 has an annular bead clamping face 33 beneath and parallel to the shoulder 18 of the fixed mold member for clamping the small bead of the bellows blank. The head 29 carries an upwardly flaring tubular collar 34 that projects above the clamping face 33 for engagement with the underside of the diaphragm 21 during the closing movement of the mold as shown in Figs. 1 and 2.

The bellows blank to be molded is supported between the mold members and axially alined therewith by means of a supporting ring 35 that is adjustably secured by clamping collars 36 to vertical rods 37 that are slidably guided in the base 11 and supported on the head 12 by means of springs 38. The ring 35 has a downwardly tapering circular rib 39 that fits in the positioning groove 27 of the clamping member 24 to insure proper alinement of the blank with the mold members when the mold is closed. The ring 35 has flat top and bottom sealing faces 40 and 41 that are clamped between the sealing faces 15 and 24 of the upper and lower mold members when the mold is closed. The supporting ring 35 has an interior positioning face 42 of a diameter to receive the large end of the bellows blank. The periphery of the blank fits snugly within the positioning face 42 which is slightly tapered to provide support for the blank. Above the face 42 the interior of the ring 35 is provided with a chamfered upper portion 43 to facilitate the entry of the bellows blank which terminates in a shallow shoulder 44 that overlies the top of the positioning face 42.

Figure 1:
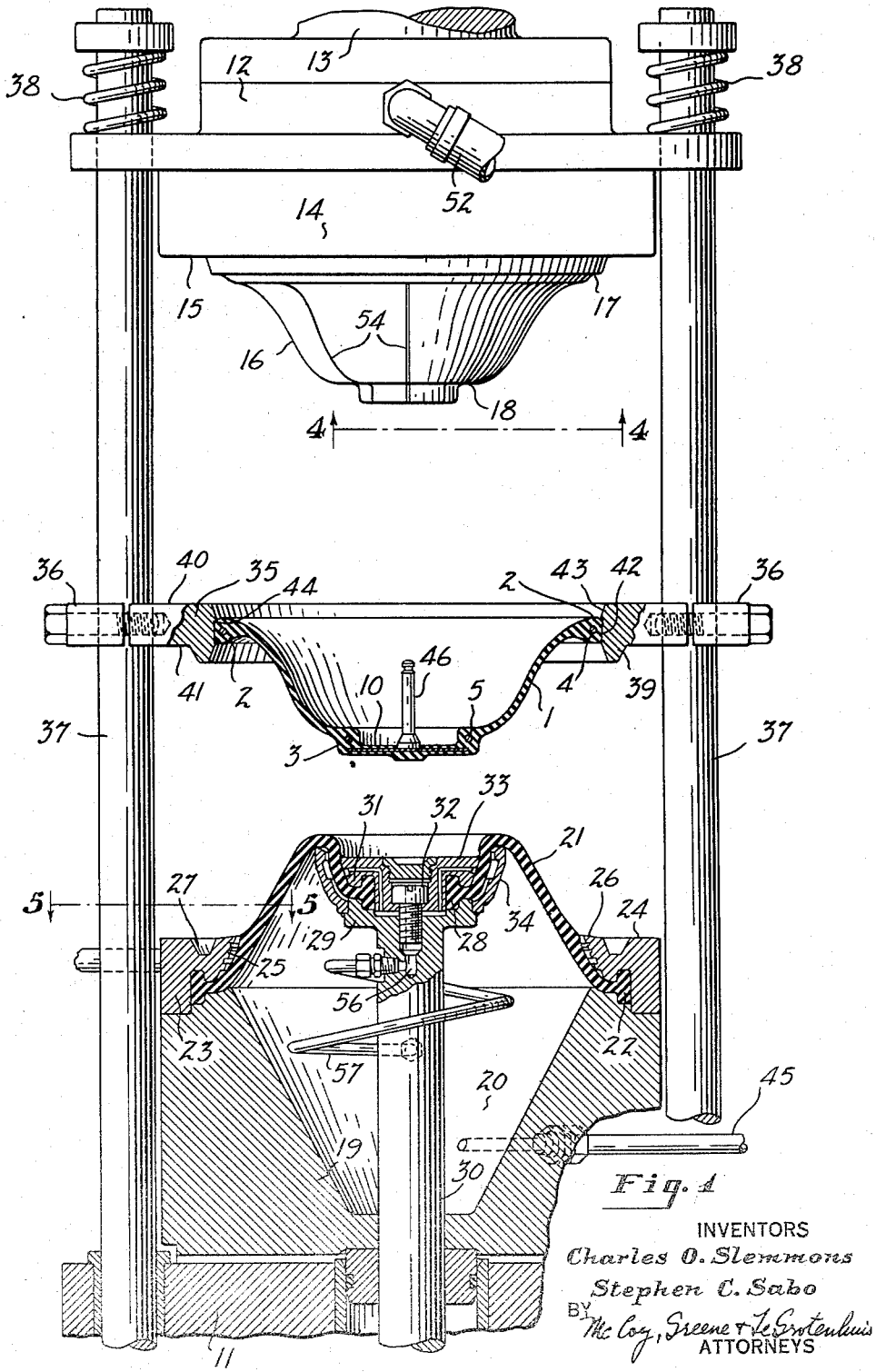
Fig. 1 is a view partly in vertical section and partly in side elevation, showing the parts of the mold in open position and the blank to be molded supported between the mold members.
Figure 2:
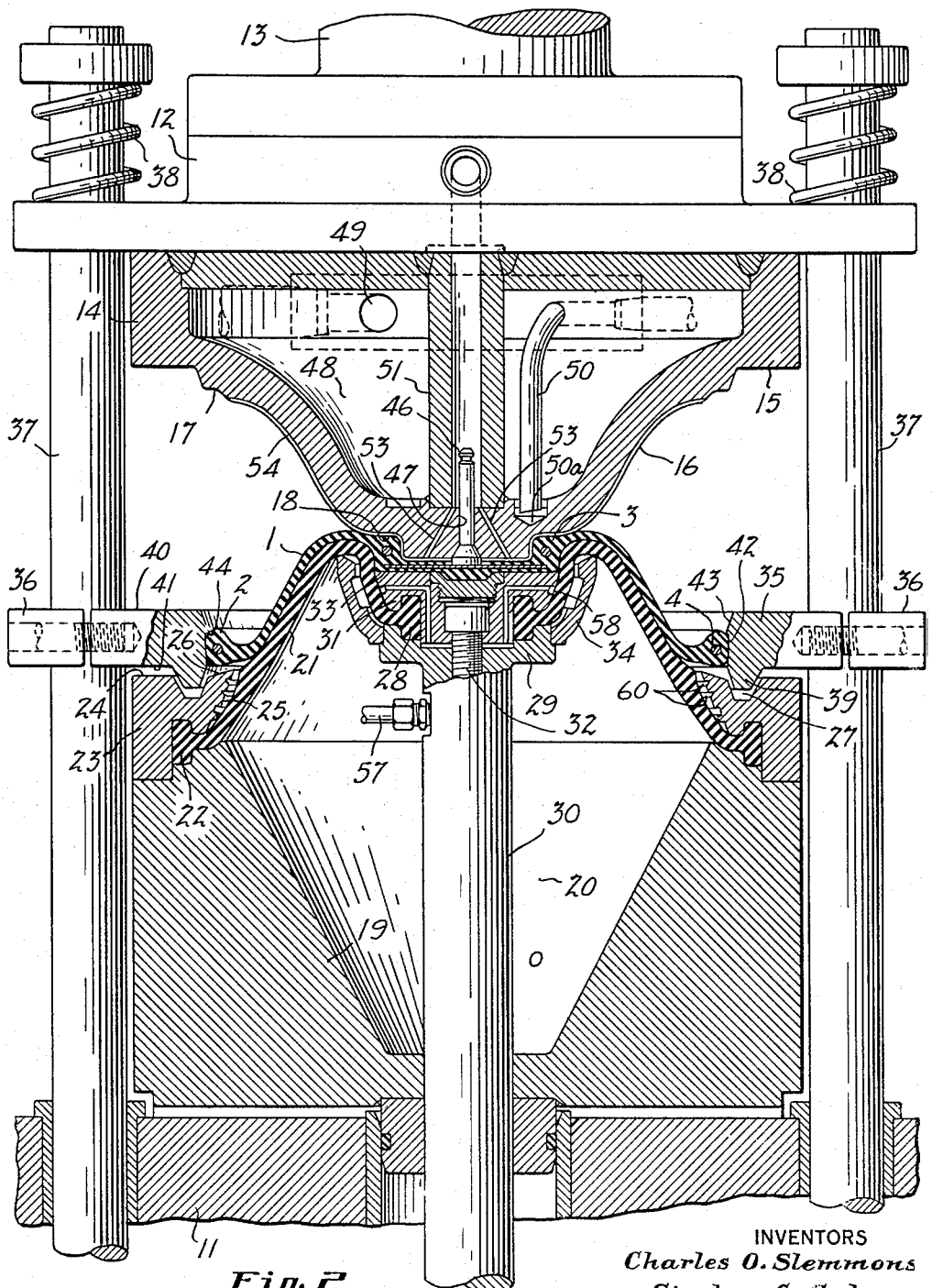
Fig. 2 is a vertical section showing the mold parts in the position they occupy when the bellows blank is turned inside out over the diaphragm.

As shown in Fig. 1, fluid under pressure is supplied to the chamber 20 through a conduit 45 to press the diaphragm 21 upwardly. A guide pin 46 which may be permanently attached to the closure disk 10 is received in a central guide bore 47 in the upper mold member 14 to insure accurate centering of the bellows blank in the mold. The upper mold member 14 is hollow and provides a steam chamber 48 to which steam may be admitted through an inlet 49 to apply heat to the bellows blank to vulcanize the same. A conduit 50 is provided for draining condensate from an annular recess or well 50a at the bottom of the chamber 48.

In the operation of the mold the blank to be molded and vulcanized is placed in position in the supporting ring 35 while the head 12 is in its uppermost position and, prior to the closing of the mold, the diaphragm supporting head 29 is moved to its uppermost position as shown in Fig. 1 where the diaphragm 21 tapers upwardly from its outer supporting ring 23. When downward movement is imparted to the head 12, the rods 37 and blank supporting ring 35 which are yieldably supported on the head 12, move downwardly with the head, causing the lower end of the blank to engage with the cap 31, which arrests the movement of the small end of the blank while the supporting ring 35 carrying the large end of the blank continues to move downwardly, and turns the flexible wall of the bellows blank inside out over the rounded annular shoulder formed by the portion of the diaphragm 21 that is bent back over the top edge of the tubular collar 34 as shown in Fig. 2.

Figure 3:
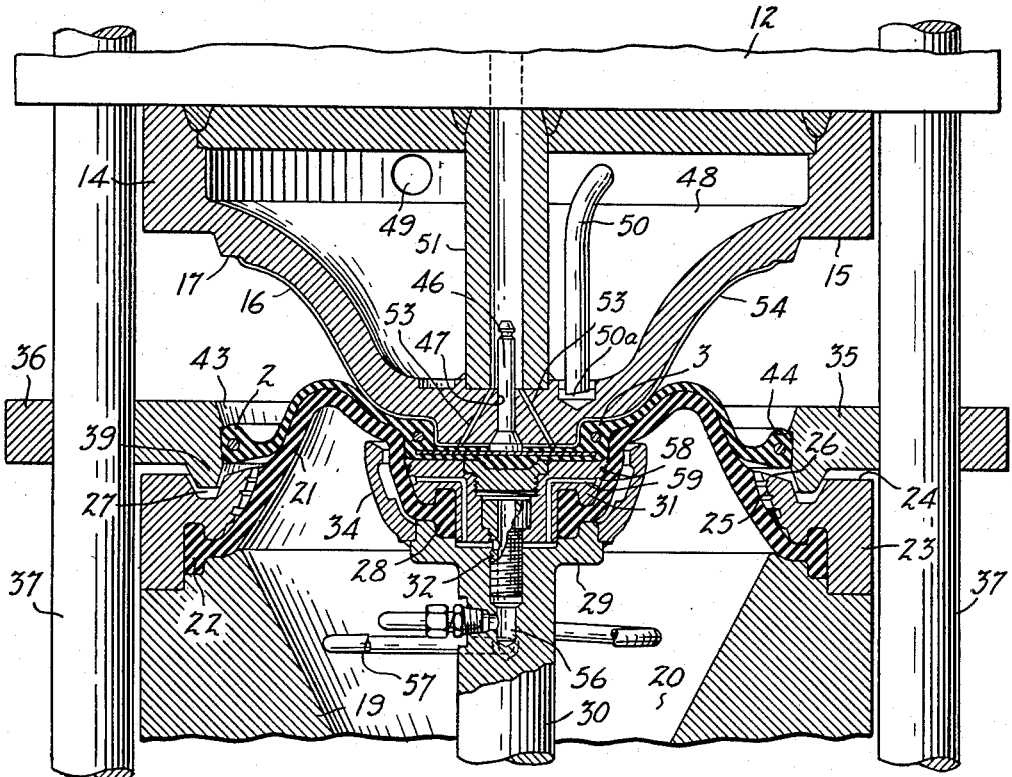
Fig. 3 is a fragmentary vertical section showing the mold parts in the positions which they occupy at an intermediate stage in the return movement of the diaphragm and blank.
Figure 5:
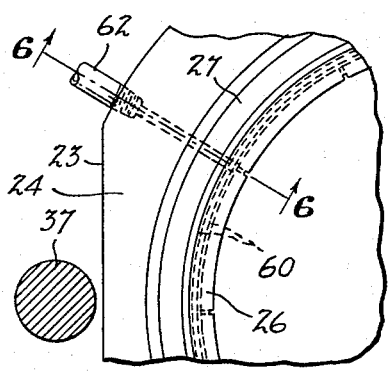
Fig. 5 is a fragmentary top plan view taken as indicated at 5—5 in Fig. 1, showing a portion of the outer annular clamping portion of the lower mold member.
Figure 6:
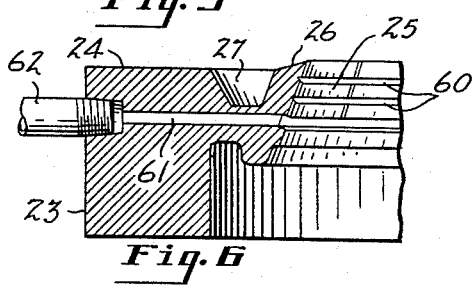
Fig. 6 is a section taken on the line indicated at 6—6 in Fig. 5.

After the tip of the core portion 16 engages the small end of the bellows blank and clamps it against the cap 31, the head 29 and post 21 begin to move downwardly with the upper mold member and during this movement air under pressure is maintained in the chamber 20 to maintain pressure on the portion of the flexible wall of the blank that engages the core as said flexible wall is being progressively brought into engagement with the core portion 16 as shown in Fig. 3 of the drawings. As the downward movement of the head 12 is continued, the diaphragm 21 and the flexible wall of the bellows blank in engagement with it are brought to the molding position shown in Fig. 7 where the large bead of the blank is clamped between the shoulder 17 and the clamping face 26 of the ring 23 and the small bead of the blank is clamped between the shoulder 18 and the clamping face 33 while the flexible body of the blank is compressed between the diaphragm 21 and the surface of the core 16.

Figure 4:
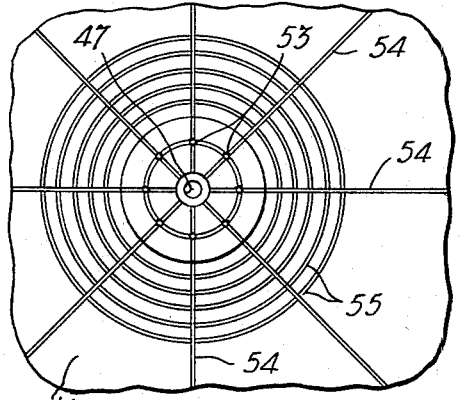
Fig. 4 is a bottom plan view on an enlarged scale of the core portion of the mold member viewed as indicated at 4—4 in Fig. 1 and showing grooves and outlet openings for exhausting air from between the core and blank.

In order to prevent entrapment of air in the mold cavity, means is provided for exhausting air from the cavity during the final closing movement of the mold. An exhaust passage is provided in the upper mold member 14 by means of a central tube 51 extending from the top to the bottom of the chamber 48 and communicating with the mold cavity through a series of radiating passages 53 leading to the bottom face of the core portion 16. The face of the core portion 16 is provided with fine radial grooves 54 that open to the passages 53 and that are connected by spaced circumferential grooves 55 as shown in Fig. 4. After the core portion 16 has been brought into engagement with the small end of the bellows blank as shown in Fig. 2, air is exhausted through the tube 51, passages 53 and grooves 54 and 55 to prevent entrapment of air between the flexible wall of the bellows blank and the external surface of the core portion 16 while the wall of the blank is being pressed against the surface of the core portion. At the same time, air is exhausted from the underside of the blank through an axial passage formed by the tubular bolt 32 and axial passage 56 in the guide post 30 and a flexible vacuum line 57 in the chamber 20 which connects the passage 56 in the post 30 to a suitable outlet in the mold body 19. The passage 56 is connected to the peripheral face of the cap 31 by radial passages 59 and the peripheral face of the cap 31 is provided with grooves 58 which communicate with the passages 59 to exhaust air from beneath the small beaded end portion of the bellows blank. Means is also provided for exhausting air from beneath the large beaded end of the bellows blank during the final portion of the closing movement of the mold, the interior face 25 of the clamping ring 23 being provided with grooves 60 which communicate with a radial passage 61 in the ring that is connected to a vacuum line 62.

The blank is formed with layers of rubber interiorly and exteriorly of the fabric plies and additional rubber is applied to the bead portions. During vulcanization the bead portions of the blank are clamped between rigid mold members so that the beads are accurately molded to the desired dimenson for accurate fit in the air spring mounting members and the flexible bellows wall is pressed with uniform pressure per unit area against the rigid core.

It is to be understood that in accordance with the provisions of the patent statutes, variations and modifications of the specific devices herein shown and described may be made without departing from the spirit of the invention.

What we claim is:

1. The method of molding and vulcanizing an air spring bellows from a blank that has been formed by building a tube of uncured rubber and fabric that has superposed plies of bias cut cord fabric disposed with their cords in crossing relation, expanding an end of the tube and applying inextensible bead rings to the large and small ends thereof, which comprises flexing the bellows blank by moving the small end thereof axially with respect to the large end and across the plane of said large end, returning the small end to the position relative to the large end which it normally occupies in the completed bellows, molding said blank under pressure, and applying heat to vulcanize the molded blank.

2. The method of molding and vulcanizing an air spring bellows from a blank that has been formed by building a tube of uncured rubber and fabric that has superposed plies of bias cut cord fabric disposed with their cords in crossing relation, expanding an end of the tube and applying inextensible bead rings to the large and small ends thereof, which comprises moving the small end of the blank relative to the large end and through the same to turn the blank inside out, returning the small end of the blank through the large end thereof and to the position relative to the large end which it normally occupies in the completed bellows, molding the blank under pressure, and applying heat to vulcanize the molded blank.

3. The method of molding and vulcanizing an air spring bellows from a blank that has been formed by building a tube of uncured rubber and fabric that has superposed plies of bias cut cord fabric disposed with their cords in crossing relation, expanding an end of the tube and applying inextensible bead rings to the large and small ends thereof, which comprises flexing the bellows blank by moving the small end thereof axially with respect to the large end and across the plane of said large end, returning the small end to the position relative to the large end which it normally occupies in the completed bellows, molding said blank under pressure by clamping the end beads of the blank between rigid mold members and the flexible body thereof between a rigid member and a fluid pressure actuated diaphragm, and applying heat to vulcanize the molded blank.

4. In the method of making an air spring bellows in which a tube of uncured rubber and fabric having superposed plies of bias cut cord fabric disposed with their cords in crossing relation is expanded at one end to a diameter more than twice the diameter of the small end and greater than the length of the tube and in which inextensible bead rings are applied to the large and small ends of the tube, the steps which comprise flexing the blank so formed by moving the small end thereof axially relative to the large end and through the same to turn the blank inside out, returning the small end through the large end and to the position with respect to the large end which it normally occupies in the completed bellows, molding the blank so formed under pressure, and applying heat to the molded blank to vulcanize the same.

5. In the method of making an air spring bellows in which a tube of uncured rubber and fabric having superposed plies of bias cut cord fabric disposed with their cords in crossing relation is expanded at one end to a diameter more than twice the diameter of the small end and greater than the length of the tube and in which inextensible bead rings are applied to the large and small ends of the tube, the steps which comprise flexing the blank so formed by moving the small end thereof axially relative to the large end and through the same to turn the blank inside out, returning the small end through the large end and to the position with respect to the large end which it normally occupies in the completed bellows, molding the blank between a rigid mold member with a core portion that conforms to the interior of the air spring bellows, and relative movable mold members in the form of concentric annular rigid members that clamp the beads and a fluid pressure actuated diaphragm that presses the tubular body of the blank against said core portion, and applying heat to the molded blank to vulcanize the same.

6. In the method of making an air spring bellows in which a tube of uncured rubber and fabric having superposed plies of bias cut cord fabric disposed with their cords in crossing relation is expanded at one end to a diameter more than twice the diameter of the small end and greater than the length of the tube and in which inextensible bead rings are applied to the large and small ends of the tube, the steps which comprise placing the blank in axial alinement with a rigid mold member having a core portion shaped to conform to the interior of the bellows with its large end facing said member and between said mold member and a second axially alined mold member having rigid concentric inner and outer annular portions for clamping the beaded ends of said blank to said rigid mold member, an annular flexible diaphragm connected at its inner and outer peripheries to said annular portions and means for applying fluid under pressure to said diaphragm to press it against the exterior wall of said blank, moving the inner annular portion axially toward the blank to taper the diaphragm reversely with respect to the wall of the blank and to push the small end of the blank through the large end to reverse the wall of the blank and engage it with the reversely tapered diaphragm, clamping the small end of the blank between the mold members and moving the rigid mold member axially with respect to the outer annular clamping portion of the opposed mold member and into said diaphragm to again reverse the diaphragm and blank wall, and vulcanizing said blank while fluid pressure is applied to said diaphragm to press the same against the exterior of the blank.

7. The method of forming an air spring bellows according to claim 6 in which fluid pressure is applied to said diaphragm during movement of the rigid member into the diaphragm to prevent entrapment of air between said rigid mold member and the wall of said blank.

8. The method of forming an air spring bellows according to claim 7 in which air is exhausted from between the diaphragm and the core portion during the closing of the mold.

9. A mold for vulcanizing a tubular air spring bellows having beaded ends of different diameters comprising a pair of axially alined mold members that are relatively movable axially into and out of molding position, one of said mold members being a rigid member provided with a projecting core portion that conforms to the interior of the bellows and with concentric annular shoulders for engagement with the end beads of the bellows blank, the other of said mold members having inner and outer relatively axially movable annular clamping portions for clamping the end beads of the bellows blank to the annular shoulders of said rigid mold member, a flexible annular diaphragm for engagement with the exterior of the tubular wall of a bellows blank clamped to said shoulders to press the same against said core portion, said diaphragm having its inner and outer peripheries attached to said inner and outer clamping portions, means for supporting a bellows blank in axial alinement with and between said mold members, and means for applying fluid pressure to said diaphragm to press said inner clamping portion toward said opposed mold member and to press said diaphragm against the tubular wall of the bellows blank.

10. A mold for vulcanizing a tubular air spring bellows having beaded ends of different diameters comprising a pair of axially alined mold members that are relatively movable axially into and out of molding position, one of said mold members being a rigid member provided with with a projecting core portion that conforms to the interior of the bellows and with concentric annular shoulders for engagement with the end beads of the bellows blank, the other of said mold members having inner and outer relatively axially movable annular clamping portions for clamping the end beads of the bellows blank to the annular shoulders of said rigid mold member, said other member having a central recess within the outer of said clamping portions and a flexible annular diaphragm having its inner and outer peripheries attached to said inner and outer clamping portions, said diaphragm and said inner clamping portion providing with said recess an expansible pressure chamber, means for guiding said inner clamping portion for axial movement, and means for supporting a bellows blank between said mold members in axial alinement therewith.

11. A mold for vulcanizing a tubular air spring bellows having beaded ends of different diameters comprising a pair of axially alined mold members that are relatively movable axially into and out of molding position, one of said mold members being a rigid member provided with a projecting core portion that conforms to the interior of the bellows and with concentric annular shoulders for engagement with the end beads of the bellows blank, the other of said mold members having inner and outer relatively axially movable annular clamping portions for clamping the end beads of the bellows blank to the annular shoulders of said rigid mold member, a flexible annular diaphragm for engagement with the exterior of the tubular wall of a bellows blank to press the same against said core portion, said diaphragm having its inner and outer peripheries attached to said inner and outer clamping portions, said inner clamping portion being supported for axial movement through said outer annular clamping portion to reverse the taper of said diaphragm, means for supporting a bellows blank in axial alinement with and between said mold members with its small end facing said inner clamping member, and means for applying fluid pressure to said diaphragm to move the diaphragm and inner clamping member toward said blank and to press the tubular body of the blank against said core member during closing of the mold.

References Cited in the file of this patent

UNITED STATES PATENTS

| | | |
|---|---|---|
| 2,468,697 | Wiley | Apr. 26, 1949 |
| 2,625,981 | Wallace | Jan. 20, 1953 |
| 2,730,763 | Brundage | Jan. 17, 1956 |